(No Model.)　　　　　　　　　　　　　　5 Sheets—Sheet 1.
J. A. BOOTH.
MACHINE FOR SOLDERING END PIECES ON CANS.
No. 584,754.　　　　　　　　　Patented June 15, 1897.

WITNESSES.　　　　　　　　　　　　INVENTOR (No Model.)

5 Sheets—Sheet 2.

J. A. BOOTH.
MACHINE FOR SOLDERING END PIECES ON CANS.

No. 584,754.

Patented June 15, 1897.

WITNESSES

INVENTOR
James A. Booth
By Bowdoin S. Parker Atty (No Model.) 5 Sheets—Sheet 5.

J. A. BOOTH.
MACHINE FOR SOLDERING END PIECES ON CANS.

No. 584,754. Patented June 15, 1897.

WITNESSES
INVENTOR
James A. Booth
by Bowdoin S. Parker
atty.

UNITED STATES PATENT OFFICE.

JAMES A. BOOTH, OF EVERETT, MASSACHUSETTS, ASSIGNOR, BY DIRECT AND MESNE ASSIGNMENTS, TO THOR H. NEILSEN, OF BOSTON, AND EDWIN E. BARTLETT, OF HYDE PARK, MASSACHUSETTS.

MACHINE FOR SOLDERING END PIECES ON CANS.

SPECIFICATION forming part of Letters Patent No. 584,754, dated June 15, 1897.

Application filed February 24, 1896. Serial No. 580,354. (No model.)

*To all whom it may concern:*

Be it known that I, JAMES A. BOOTH, of Everett, in the county of Middlesex and State of Massachusetts, have invented a certain new and useful Improvement in Automatic Machines for Soldering End Pieces on Cans, of which the following, taken in connection with the accompanying drawings, is a specification.

My present invention relates to machines for soldering heads or end pieces on can-bodies.

I am aware that certain simple machines, to be operated and manipulated by hand, have heretofore been used. Such was my invention patented June 25, 1889, and numbered 405,822. I retain a few features shown in my former invention, but have perfected the old devices and combined them with others in an entirely new and novel manner and in such a construction as will perform operations that my hand-machines did not attempt. I also operate the several devices of this machine entirely automatically. My present machine reduces the number of workmen required to tend a machine and does more and better work than the hand-machine.

It has been heretofore necessary to apply the acid to the parts to be soldered by hand or in a distinct machine for the purpose, but I do both the aciding and the applying of the solder automatically, completing both operations at once.

Figure 1:
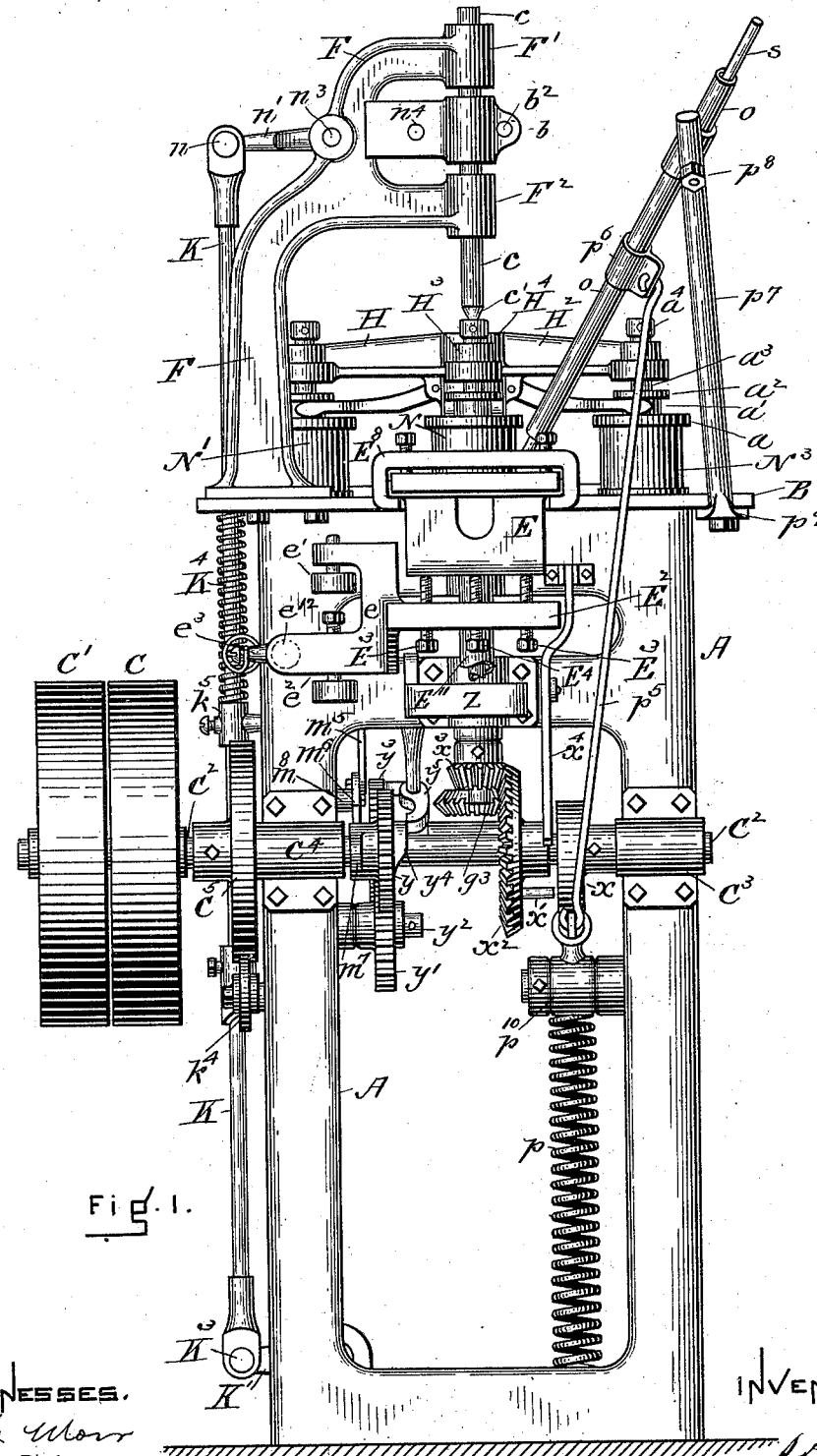
Figure 2:
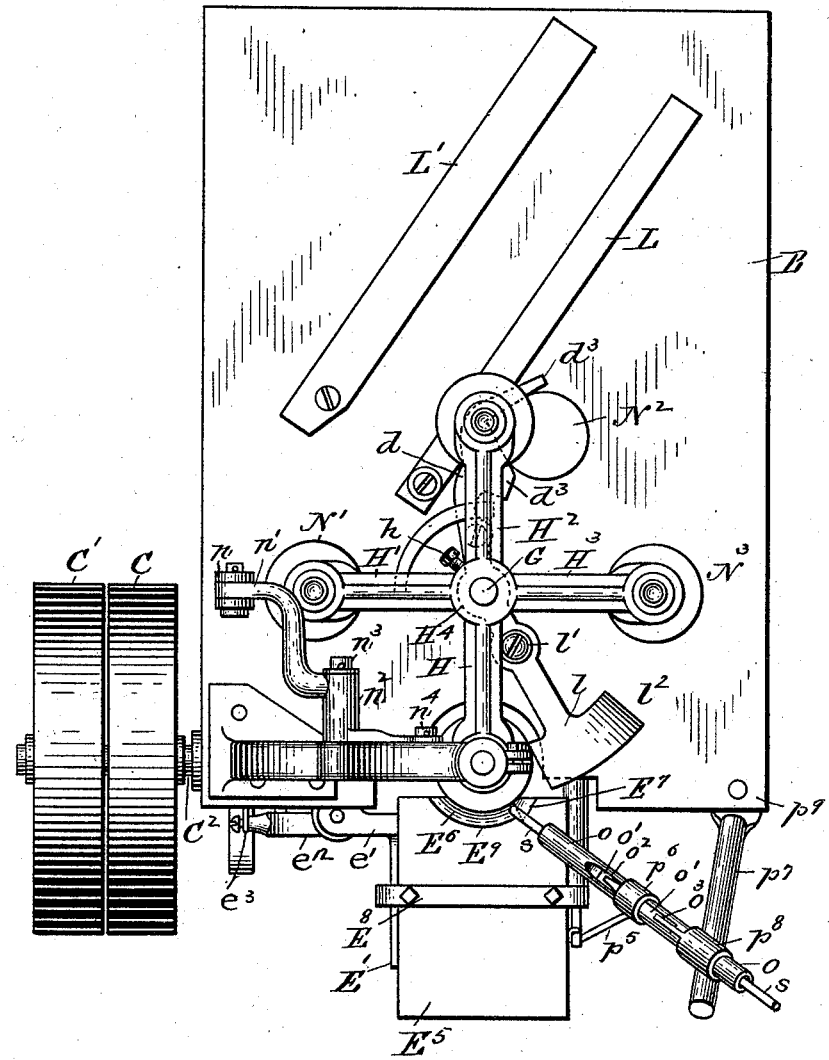
Figure 3:
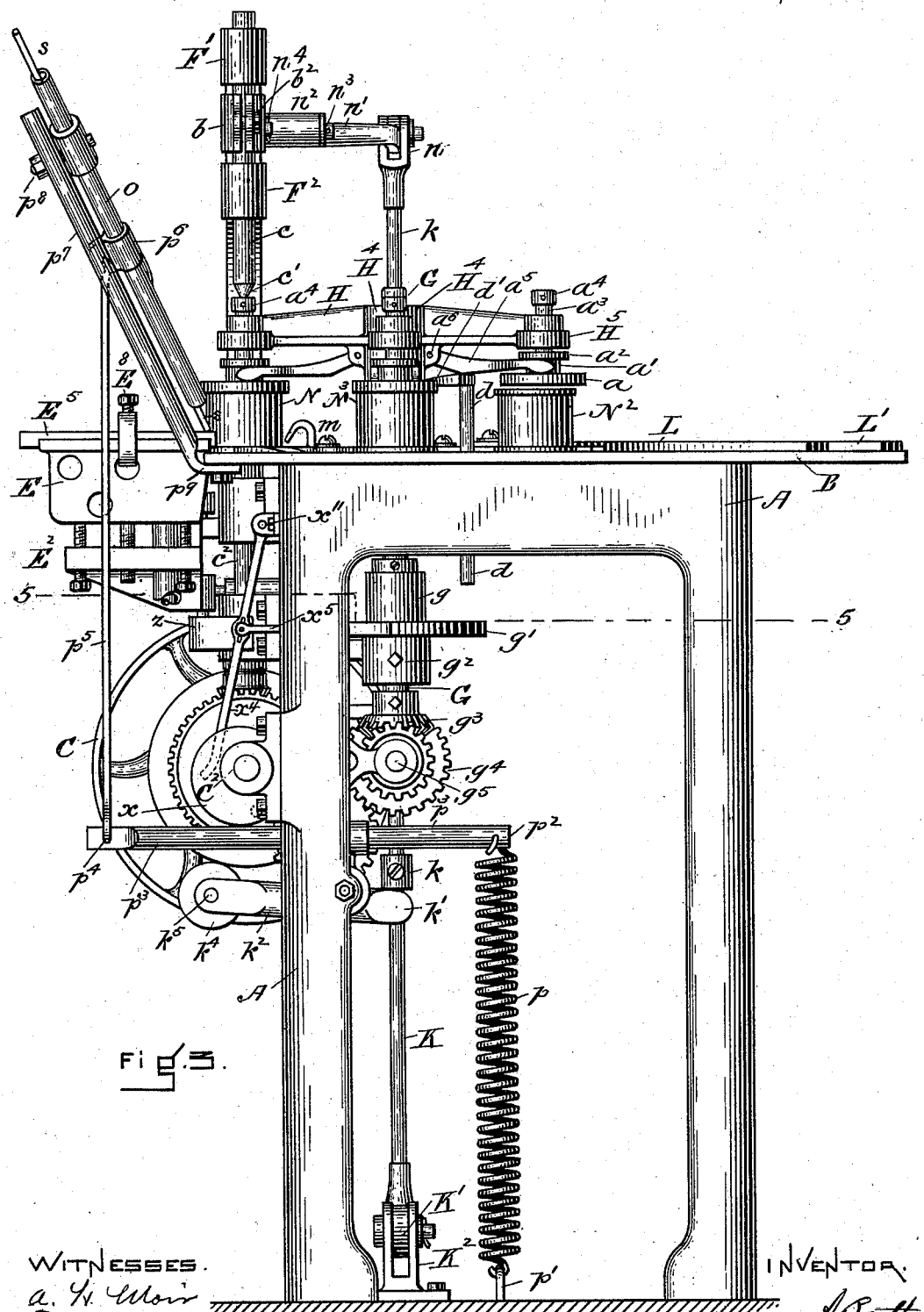
Figure 4:
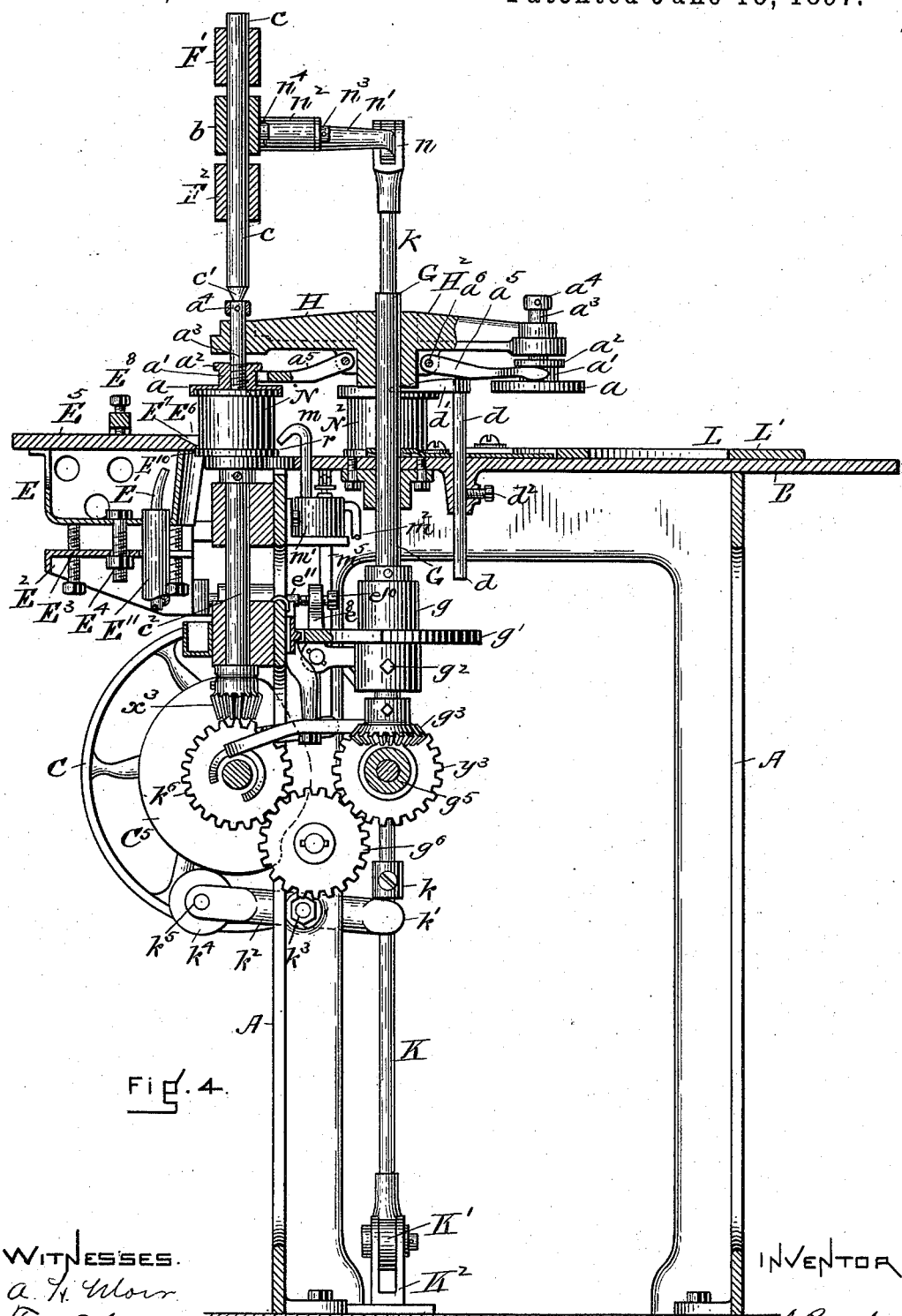
Figure 5:
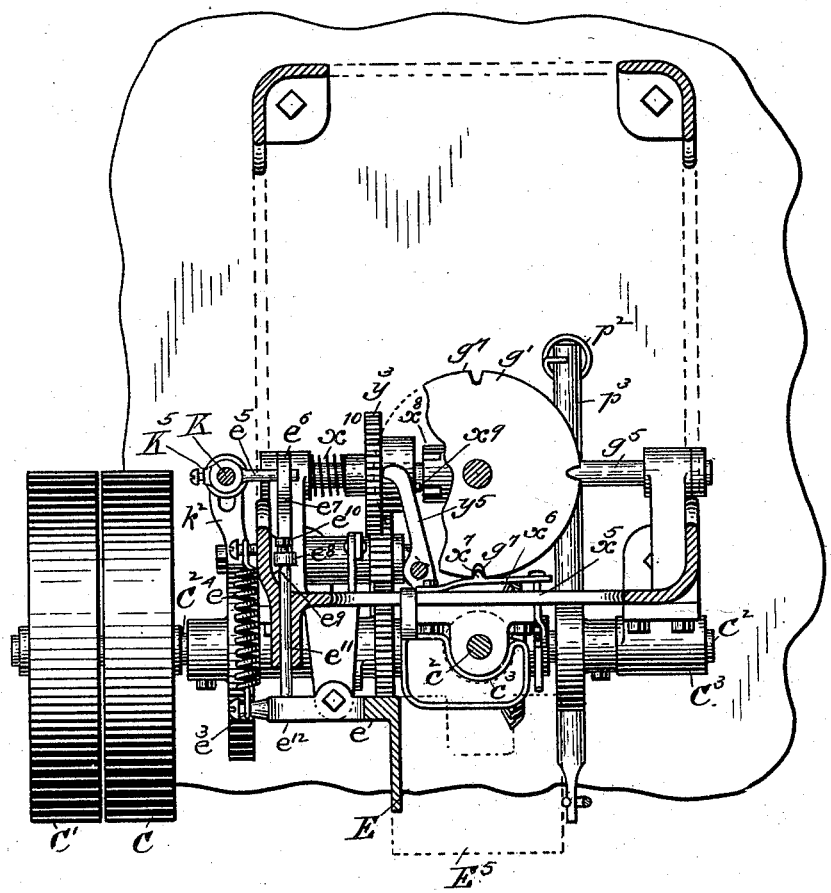
Figure 6:
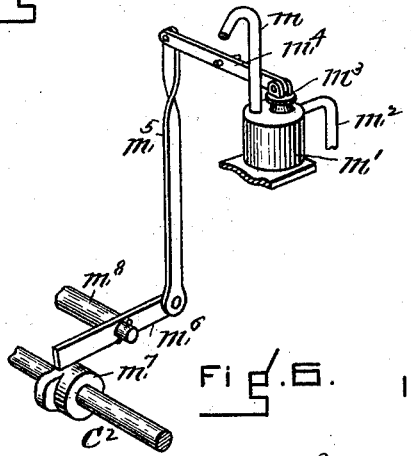

In the drawings, Figure 1 is a front elevation of the machine. Fig. 2 is a top view. Fig. 3 is a side elevation. Fig. 4 is a sectional elevation on the line 5 5 of Fig. 3. Fig. 5 is a top view of the machine with the table removed. Fig. 6 is a detail of the device for supplying and regulating the flow of the acid.

Like letters of reference indicate corresponding parts.

The can-body having been suitably prepared with a flanged head or end piece upon its lower end, is placed against the gage upon the table, there taken and conveyed between two spindles, preferably a live and a dead spindle, and the can-body being revolved by the live-spindle the acid and solder are applied and the soldering of the end piece to the can completed. The can-body with the end is then removed and delivered at another point upon the table, and the same operation is repeated with another can-body replacing the first, the whole series of movements and results being performed automatically. Each end or head is soldered on the body separately as a distinct operation.

The machine comprises a combination of devices operating together which perform all the manipulations of the article and all the distinct acts required in soldering, the whole constituting one complete operation. All that is necessary is that the can-body be first placed in the proper position against the gage upon the table, and the machine mechanism does the rest automatically.

The machine proper consists of the frame A A and top B, to which are secured the operative devices hereinafter described. The main shaft $C^2$ is suitably journaled in boxes $C^3$ and $C^4$ and secured to the frame beneath the table or top B, as shown in Fig. 1. The shaft $C^2$ is driven from the pulley C, and a loose pulley $C'$ is provided for convenience. Parallel with the main shaft $C^2$ is a second shaft $g^5$.

On shaft $C^2$ is placed gear $x^2$, meshing with gear $x^3$, the latter being secured on the lower end of upright shaft $c^2$, suitably journaled to the frame. On the upper end of shaft $c^2$ is placed the disk $c^3$. (Represented by dotted line in Fig. 5.) The shaft and disk constitute a live-spindle, upon which the bottom of the can rests and by means of which it is revolved in the process of soldering, as hereinafter described. On shaft $C^2$ is also placed the cam-wheel $C^5$, Fig. 1, the form being shown by the broken line in Fig. 4. Against the edge of cam-wheel $C^5$ presses the loose wheel $k^4$, journaled at $k^5$ in the end of the lever $k^2$, said lever being movably secured to the frame at $k^3$. Resting upon the opposite end $k'$ is the part $k$, adjustably secured to the upright rod K. Said rod is pivotally connected at its lower end $K^3$ to an arm $K'$, which arm is pivoted to the foot-piece $K^2$, as shown in Figs. 1, 3, and 4. The object of the bottom attachment is simply to hold and steady the rod K in place, while permitting a vertical movement of the rod. The same result could of course be reached by other well-known means. A second piece $K^5$ is adjustably secured to said rod and supports a spiral spring $K^4$, Fig. 1, the upper end resting against the under side of the top B of the machine. This spring, together with the weight of the rod and attachments, tends to press the rod down and causes the piece $k$ to press upon the end of lever $k'$ and thus keep the wheel $k^4$ in contact with cam-wheel $C^5$.

The rod K preferably passes through the table B and is pivoted at its top $n$ to an arm $n'$, and the arm being journaled to the side of the part F, as shown in Figs. 1, 2, 3, and 4, at $n^2$ and $n^3$, the extended end of said bent arm being pivotally connected at $n^4$ with clamp $b$, which clamp holds the dead-spindle $c$, pointed at its lower end $c'$, the spindle-bar being held in the bearings $F'$ and $F^2$ and actuated vertically by the raising or depressing of the rod K. The piece $K^5$ also performs another important function. A projection or rod $e^5$, Fig. 5, extends from $K^5$ inwardly and fits into the forked or slotted end $e^6$ of lever $e^7$, which lever is pivotally journaled to the frame or a suitable bracket attached to the frame $e^9$, and the other end or arm of said lever, formed at right angles, extends upward, the top of this arm being shown at $e^8$ in Fig. 5. Near the top of the arm $e^8$ of the lever $e^7$ is placed a set-screw $e^{10}$, which is arranged to preferably extend entirely through the arm $e^8$. Resting against the end of the set-screw $e^{10}$ is the loose bar or rod $e^{11}$. This rod or bar is held by the frame through which it passes, the hole in the frame being sufficiently large to admit of its free movement. The opposite or outer end of said bar or rod $e^{11}$ rests against the extension end $e^{12}$ of the hinge $e$, and said hinge is supported by the pivotal staples $e'$ $e^2$, Fig. 1, attached to the frame. The hinge $e$ carries the shelf $E^2$, to which is attached by suitable adjustable bolts and set-screws the fire or heating box E.

On the extreme end $e^3$ of the extension of the lower part of hinge $e$, Figs. 1, 2, and 5, is secured the spiral spring $e^4$, Fig. 5, the opposite end being held by a screw inserted in the frame, as shown in Fig. 5, or otherwise held in any convenient manner.

In the operations of placing the can between the spindle ends $c'$ and $c^3$ and the soldering of the can-head to the body and subsequent removal of the can from between the spindles it is necessary to remove the heater-box E from the frame as soon as the soldering is completed to allow the removal of the can and the placing of another between the spindles. This is accomplished by means of the devices just described. When the rod K is raised, the piece $K^5$ raises the lever $e^7$ by means of the rod $e^5$, and the upper end of lever $e^8$ moves outwardly, and the set-screw $e^{10}$ presses against the movable rod $e^{11}$, which in turn presses against the end $e^{12}$ of the hinge $e$, and the shelf $E^2$, being joined to the hinge $e$, is forced with the heating-box E, which is attached to it, up close to the front of the frame. As soon as the soldering is completed the rod K is caused to fall, the rod $e^{11}$ is released by the movement of levers $e^5$ and $e^7$, and the shelf and its heating-box are removed by the action of spring $e^4$, attached to end $e^3$ of hinge $e$.

It will be observed that as long as the rod $e^{11}$ is caused to press against the end $e^{12}$ of hinge $e$ and the spring $e^4$ is caused to pull against the pressure of said rod the hinge, bracket, and heater-box will be held firmly, whether the box or any of its parts rest against the frame or not. In soldering cans of varying sizes it is important that the heating-box should be adjusted so that it will be closed against the frame as may be desired. This is accomplished by means of the set-screw $e^{10}$, which will press the rod $e^{11}$ outward in proportion to the distance the end of the set-screw projects through the end of lever $e^8$. The nearness of the heating-box to the front of the machine can therefore be nicely adjusted by means of said set-screw $e^{10}$.

The heating-box E is of any convenient form, and is secured to the movable shelf $E^2$ by the bolt $E^4$, and may be adjusted by means of the set-screws $E^3$. Suitable holes on the side are provided for the escape of gas within the box, and the top is covered with a thick plate of steel $E^5$, which may be clamped on the top of the box, as shown by $E^8$. This plate is so placed that its under edge will be slightly above the disk $c^3$ of the live-spindle. The edge of the plate $E^5$ is concaved at $E^9$ to approximately correspond with the periphery of the can head and body, and is also beveled for about half the thickness of the plate, as shown by $E^6$, Fig. 2. At one side of said bevel a small slot $E^7$ is formed to receive the end of the solder-wire $s$. The edge of the plate underneath the bevel is recessed back slightly, so that in soldering the upper edge of the plate will rest against the can-body and the recessed edge will rest against the fold of the head or end piece to be soldered to the can-body. The recess is represented by $E^{10}$, Fig. 4.

The plate $E^5$ is heated by any suitable apparatus. An ordinary Bunsen burner $E'$ is shown, and may be supplied by a gas-pipe $E^{11}$. The plate $E^5$ being kept hot the solder is melted from the wire and continuously presented at the proper point as the can is revolved between the spindles, as hereinbefore described.

The flux or acid is applied to the joint to be soldered by the devices illustrated in detail in Fig. 6. The acid is contained in airtight tank $m'$, supplied to it under pressure by pipe $m^2$. Within the tank is placed a valve of any ordinary construction $m^3$, operated by the lever $m^4$, actuated by connecting-rod $m^5$ and lever $m^6$, adapted to be actuated by cam $m^7$, attached to hub of gear-wheel $y$ on the main shaft $C^2$. The cam $m^7$ may be separately attached either to shaft $C^2$ or by reversing the lever $m^6$ to shaft $g^5$. When the valve is opened by the device described, the acid will be delivered through the tube $m$ (see Fig. 4) at the proper point upon the bottom of the can to be soldered. The tank is placed underneath the table and the tube $m$ extended upward to the delivering-point.

The secondary shaft $g^5$ has upon it the flanged gear-wheel $g^4$, Fig. 3, which meshes with and actuates bevel-gear $g^3$, placed upon the lower end of standard G. The flange or hub of gear-wheel $g^4$ is shown at $x^3$ in Fig. 5 and is provided with recesses, as shown. Next beside this is placed the loose gear-wheel $y^3$, having upon the end of its flange or hub the pin $x^9$, Fig. 5, to fit the recesses in the hub $x^3$ of wheel $g^4$. Upon the opposite side of gear-wheel $y^3$ and pressing against its hub is the spring $x^{10}$, which tends to press the gear-wheel $y^3$ toward gear-wheel $g^4$.

On the main shaft $C^2$ is placed the gear-wheel $y$, Fig. 1, meshing into loose gear-wheel $y'$, held in position by its journal $y^2$, secured to the frame of the machine. Gear-wheel $y'$ meshes with and actuates loose gear-wheel $y^3$ on the secondary shaft. On the side of gear-wheel $y$ is formed a cam $y^4$, Fig. 1, which actuates the lever $y^5$, Figs. 1 and 5, the opposite end of said lever pressing against the side of loose gear-wheel $y^3$. When the lever is actuated by the cam $y^4$, it slides wheel $y^3$ to the left and withdraws the pin $x^9$ from the recess in hub and of course ceases to actuate wheel $g^4$. As the lever is released from contact with cam $y^4$ the spring $x^{10}$, Fig. 5, forces the connections of wheels $y^3$ and $g^4$ together, interlocking them, as before described.

Upon the upper end of standard G is adjustable hub $H^4$, to which are attached radial arms, represented herein as four in number, H H' $H^2$ $H^3$. Beneath these arms and secured to standard G is the wheel $g'$, with its hub $g$ secured to said standard by bolt $g^2$, Figs. 3, 4, and 5. This wheel $g'$ is provided with notches $g^7$, corresponding with the number of arms. When one of the arms is brought directly to the front, so that a can is placed upon the live-spindle top $c^3$, Fig. 5, one of the notches $g^7$ will receive the projection $x^7$, formed on spring $x^6$, Fig. 5, and will prevent the standard G and arms from turning until the spring $x^7$ is drawn back by the rod $x^5$, the rod $x^5$ being operated by the lever $x^4$, Fig. 3, which lever is secured to the frame at one end $x^{11}$, while the free end is actuated by a cam $x'$ on the hub of gear-wheel $x^2$, Fig. 1, upon the main shaft, or an independent cam-wheel may be provided, if preferred.

The arms H, H', $H^2$, and $H^3$ may be raised or lowered in relation to the table by adjusting the hub $H^4$ on standard G and held in position by set-screw $h$, Fig. 2. At the outer end of each arm, as indicated by $H^5$, arm $H^2$, is socketed a holder $a'$, with a disk $a$, recessed upon its under side to receive a can-body $N^2$. To the holder is attached a shank $a^3$, extending upward through the end of arm $H^5$ and held in place by a washer and pin $a^4$ on the upper end of the shank. The holder is provided with a rim $a^2$ under the end of arm. A forked lever $a^5$, pivoted to the hub at $a^6$ at one end, contacts at its free end with holder $a'$, the forked ends resting between the disk $a$ and rim $a^2$, which serves to hold the lever in place and press the disk downward by its weight upon the can-top. The shank $a^3$, with holder and disk, may be moved vertically and also may be revolved independently. The holders may be removed and replaced as desired, it being important that the disk of the holder be suited to the size of the can-body. The gage $d^3$, Fig. 2, is secured to the table at a point so that a can-body placed between the two arms of the block will be in a correct position to be seized by the disk of the holder $a'$.

In order that the holder may be raised to receive the can-body, a rod $d$ is adjustably secured to the frame or table by set-screw $d^2$, Fig. 4, having a beveled piece $d'$ upon its upper end and so placed that just before the arm $H^2$ is in a position to receive a can-body placed within the arms of gage $d^3$ the lever $a^5$ is raised by the beveled piece $d'$ of the rod $d$ to the required height, said lever $a^5$ raising the can-holder $a'$ in the end of arm $H^5$. Now as soon as the said arm is sufficiently revolved so that the disk $a$ of the holder $a'$ is over the can $N^2$, Fig. 2, the lever $a^5$ passes off the bevel-piece $d'$ and instantly the disk drops over the top of the can-body. The arm $H^2$ in its revolution carries the can around to the other side until it passes between the guides L L', secured to the top of the table, where the can is released by the lever $a^5$ again sliding upon bevel-piece $d'$ and of course lifting the holder from the can. The said holder so raised is then in position to seize another can-body placed between the arms of the gage $d^3$. Each arm has the same devices and performs the same operation as described for the arm $H^2$. A plate $l$, secured to the bed of the table at one end $l'$ and having one edge $l^2$ beveled, is placed near the live-spindle top $c^3$ and raises the can-body from the table, and from which it slides to the spindle $c^2$.

The solder preferably used is wire-solder and may be fed from a coil. The solder $s$ is inserted in the tube $o$, the lower end resting in the slot $E^7$ of the heating-plate $E^5$. To the outside of the tube $o$ is secured the slide $p^6$, which moves up and down upon the outside of said tube. Upon the upper side of the tube $o$ is formed a slot $o'$. Moving in said slot is a piece of spring metal $o^2$, the upper end being secured to the slide $p^6$ and the lower end in the slot $o'$ and so formed as to rest upon the solder in tube $o$. There is also a second piece of spring metal $o^3$ secured at the upper end of slot $o'$, its lower end being in the slot $o'$ and pressing upon the solder within the said tube.

The spring-piece $o^3$ serves to retain the solder in place, while the spring-piece $o^2$ carries the said solder downward with each movement of the slide $p^6$. When the slide is moved upward, the spring-piece $o^2$ slides over the surface of the solder, it being prevented from moving upward by the end of spring-piece $o^3$ pressing upon it. Said piece $o^3$ is so formed that it does not exert much force in preventing the said solder from being carried downward by means of the spring-piece $o^2$. The tube $o$ is bolted at $p^8$ or otherwise held to the arm $p^7$, and the other end of the arm is adjustably secured at $p^9$ to the table-top B. The movement of the slide $p^6$ is regulated and actuated by means of the rod $p^5$, secured to said slide at its upper end and adjustably secured to the end $p^4$ of the lever $p^3$, the distance the slide is to move being determined relatively by the point of connection of the end of the lever $p^3$ with the end of the rod $p^5$. The lever $p^3$ is pivoted to the frame near its center $p^{10}$, and to the opposite end $p^2$ is preferably attached the spring $p$, suitably secured at the bottom $p'$. The lever $p^3$ is held by said spring against and is actuated by the cam-wheel $x$, attached to the main shaft $C^2$, Figs. 1 and 3.

Underneath the point where the soldering is done is placed the drip-cup $z$, secured to the front of the machine, which serves to catch an excess of solder flowing off from the solder-plate.

Having sufficiently described the several devices, I will now explain the operation of the machine as a whole.

A can-body with the end suitably attached to the lower end is placed in gage $d^3$ and the machine is started. The can is seized by the holder attached to the end of one of the arms and is conveyed around upon the bed of the table until it reaches the slide $l$, by which it is slightly raised, and passing over it stops so that the bottom of the can exactly rests upon the disk $c^3$ of live-spindle $c^2$. The rod K is raised, forcing the point $c'$ of dead-spindle $c$ into a slight depression formed in the top of holder-shank $a^3$, the arms being prevented from moving by the projection $x^7$ of spring $x^6$ entering the notch $g^7$ of wheel $g'$, attached to standard G. The heating-plate $E^5$ is brought in contact with the can by the moving of the box up to the table. The can is revolved by the live-spindle. The valve in the acid-tank is opened and the acid flows against the lower end of the can. The wire-solder is forced down upon the edge of the heated plate, melted, and flows against the lower end of the can and the end is soldered on. The cam $y^5$ is then reversed and allows connection to be made between the pin $x^9$ on the hub of the wheel $y^3$ and the slot in the hub of the wheel $g^4$. At the same time the wheel $g'$ is released by the withdrawal of the spring $x^6$, the dead-spindle $c$ is withdrawn by the falling of the rod K, and the heater-box and plate are drawn away by action of the spring $e^4$, and the standard G, carrying the arms, is revolved, removing the can from the live-spindle. The arms move in this construction one-fourth of a circle, and at each movement a new can is brought between the spindles to be soldered, as described. Just before reaching the full revolution the can is released by the raising of the lever $a^5$ upon the beveled arm $d'$, attached to rod $d$, and the can passes between the guides L L' and is forced by each succeeding can that arrives at the delivery-point forward and is collected in any convenient receptacle. The holder in the arm that has thus been round and delivered its soldered can is raised ready to seize another can as the arm revolves sufficiently to allow the lever $a^5$ to fall from the bevel-arm $d'$.

As each arm is similarly provided with its holder, there will be four cans at all times being manipulated, each going through the same series of movements and being soldered in the same manner as already described, all operations being performed by the several devices of the machine automatically and in conjunction.

I do not confine myself to the exact construction and details herein described, as these may be modified without departing from the spirit of my invention; but

What I claim, and desire to secure by Letters Patent of the United States, is—

1. The herein-described automatic machine for soldering end pieces to cans, consisting of a frame and table with suitable mechanism for seizing a can-body, placed at a given point upon said table, conveying it between two spindles, holding and revolving the said can, preventing the conveying mechanism from moving while said can is being held between said spindles and revolved, applying the acid and molten solder to the revolving can and soldering the end piece to the body, releasing the can from the spindles and releasing the conveying mechanism, removing the heating-plate from the can and conveying said can to the delivery-point, all arranged, combined and adapted to be actuated from a main shaft and to act in combination, automatically, substantially as and for the purposes set forth.

2. In an automatic machine for soldering end pieces to cans, the gear-wheel $y$, provided with the cam $y^4$, the gear-wheel $y'$, the loose gear-wheel $y^3$, provided with the pin $x^9$, and the lever $y^5$, in combination with the gear-wheel $g^4$, provided with the recessed hub $x^8$, and gear-wheel $g^3$, secured to the standard G and adapted to actuate it, substantially as and for the purpose set forth.

3. In an automatic machine for soldering end pieces on cans, the gear-wheel $y$, provided with the cam $y^4$, the lever $y^5$, and gear-wheel $y^3$, in combination with suitable devices for placing and removing cans in the process of soldering, substantially as set forth.

4. In an automatic machine for soldering end pieces on cans the main shaft $C^2$, gear-wheel $x^2$, secured to said main shaft; the spindle-shaft $c^2$, the gear-wheel $x^3$, secured to said spindle-shaft and adapted to actuate the live-spindle by the rotation of the main shaft, in combination with suitable can-soldering mechanism, substantially as and for the purposes set forth.

5. In an automatic machine for soldering end pieces on cans, the cam-wheel $C^5$, secured to the main shaft $C^2$, the lever $k^2$, provided with the wheel $k^4$, and adapted to actuate the vertical rod K, in combination with suitable can holding and soldering devices substantially as and for the purposes set forth.

6. In an automatic machine for soldering end pieces to cans, the rod K, the piece $K^5$, secured to said rod and having the arm $e^5$, the spring $K^4$, the lever $e^7$, having the bent arm $e^8$, the set-screw $e^{10}$, the independent movable rod $e^{11}$, in combination with the hinge $e$, provided with the shelf $E^2$, and the extension end $e^{12}$, and the spring $e^4$, substantially as and for the purposes described.

7. In an automatic machine for soldering end pieces to cans, the cam-wheel $C^5$, the lever $k^2$, provided with the wheel $k^4$, the rod K, movably secured at its lower end, and provided with the adjustable piece $k$, secured thereto, the arm $n'$, pivotally secured to the upper end of said rod, and also to the clamp $b$, the said arm being journaled to the part F, in combination with the spindle $c$, and adapted to actuate said spindle, substantially as and for the purposes described.

8. In an automatic machine for soldering end pieces to cans, the rod $x^4$, adapted to be operated by a suitable cam-movement, the rod $x^5$, the spring $x^6$, provided with the projection $x^7$, in combination with the wheel $g'$, having the notch $g^7$, the said wheel secured to the standard G, and adapted to hold the same, substantially as and for the purposes set forth.

9. In an automatic machine for soldering end pieces to cans, the heating-plate $E^5$, having a concaved circular beveled edge, a slot upon its upper side and a recessed part underneath, and adapted to be removably secured to a movable heater-box, substantially as and for the purposes set forth.

10. In an automatic machine for soldering end pieces on cans, the solder holder and conveyer, consisting of the barrel $o$, the spring $o^3$, secured at one end to said barrel, the other end being free and resting in the slot $x'$, of barrel $o$, the movable slide $p^6$, provided with the spring-piece $o^2$, secured at one end to said slide and the other end being free and resting in the slot $x'$, of barrel $o$, and adapted to hold the wire-solder within said barrel and to move the same forward, substantially as and for the purposes set forth.

11. In an automatic machine for soldering end pieces on cans, the cam-wheel $x$, secured to the main shaft $C^2$, the lever $p^3$, the spring $p$, the rod $p^5$, slide $p^6$, and the barrel $o$, arranged and adapted to hold and convey the solder intermittently to the soldering-point, and in combination with suitable soldering mechanism, substantially as set forth.

12. In an automatic machine for soldering end pieces on cans, the lever $a^5$, pivotally secured at one end to hub $H^4$, and contacting its other end with holder $a'$, the rod $d$, provided with the beveled end piece $d'$, and adapted to raise the holder $a'$, in combination with suitable conveying and soldering mechanism, substantially as and for the purposes herein set forth.

13. In an automatic machine for soldering end pieces on cans, the acid-tank $m'$, the pipe $m^2$, the pipe $m$, adapted to deliver the acid at the soldering-point, the said tank provided with a suitable valve for regulating the flow of the acid in the tank under pressure to the discharge-pipe, and arranged to be actuated by suitable cam devices, and all combined with suitable can-soldering mechanism and adapted to operate in connection therewith, substantially as and for the purposes set forth.

14. In an automatic machine for soldering end pieces on cans, the independent, socketed, rotatable, removable and vertically-movable can-holder $a'$, provided with the rim $a^2$, stem $a^3$, the rotating arm $H^5$, lever $a^5$, adjustable rod $d$, provided with the beveled end $d'$, and table B, combined with suitable can-conveying and can-soldering mechanism, all substantially as and for the purposes set forth.

15. In an automatic machine for soldering end pieces on cans, the plate $l$, provided with the beveled edge $l^2$, and adapted to be suitably secured to table B, in combination with the live-spindle $c^2$, and suitable can-revolving mechanism, all substantially as herein set forth and for the purposes described.

In testimony whereof I have signed my name to this specification, in the presence of two subscribing witnesses, on this 19th day of February, A. D. 1896.

JAMES A. BOOTH.

Witnesses:
 THORA KUNIGUNDE BJORN,
 BOWDOIN S. PARKER.